US008162700B2

(12) United States Patent
Petersen

(10) Patent No.: US 8,162,700 B2
(45) Date of Patent: Apr. 24, 2012

(54) CONNECTION BLOCK MOUNTING FRAME

(75) Inventor: Cyle D. Petersen, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/763,073

(22) Filed: Apr. 19, 2010

(65) Prior Publication Data

US 2010/0291796 A1 Nov. 18, 2010

Related U.S. Application Data

(60) Provisional application No. 61/170,412, filed on Apr. 17, 2009.

(51) Int. Cl.
*H01R 9/22* (2006.01)
(52) U.S. Cl. ........................................... 439/719
(58) Field of Classification Search ............. 439/719; 361/826; 385/135, 134
See application file for complete search history.

(56) References Cited

U.S. PATENT DOCUMENTS

| | | | |
|---|---|---|---|
| 4,871,330 A | 10/1989 | Muller et al. | |
| 5,033,974 A | 7/1991 | Biederstedt et al. | |
| 5,163,855 A | 11/1992 | Gerke et al. | |
| 5,494,461 A | 2/1996 | Bippus et al. | |
| 5,605,479 A * | 2/1997 | Kramer et al. | 439/709 |
| 5,758,002 A * | 5/1998 | Walters | 385/134 |
| 7,008,243 B2 | 3/2006 | Mueller et al. | |
| 7,147,412 B2 | 12/2006 | Davis | |

FOREIGN PATENT DOCUMENTS

DE 3728368 11/1988
DE 10001553 8/2001

OTHER PUBLICATIONS

Mounting Frame, NT200 Pair, ADC Telecommunications, Inc. (Drawing No. 1369600) dated Jul. 19, 2006, (Admitted as prior art as of Apr. 17, 2009), 1 Page.
Photograph of Top View of Mounting Frame and Associated Connection Block (Admitted as prior art as of Apr. 17, 2009), 1 Page.
Photograph of Connection Assembly Including Mounting Frame (Admitted as prior art as of Apr. 17, 2009), 1 Page.
Photographs of Mounting Frame Assembly (Admitted as prior art as of Apr. 17, 2009), 2 Pages.
Connection Assembly, NT200 Pair, ADC Telecommunications, Inc. (Drawing No. 133409), dated Apr. 28, 2006) (Admitted as prior art as of Apr. 17, 2009), 2 Pages.

* cited by examiner

*Primary Examiner* — Phuong Dinh
(74) *Attorney, Agent, or Firm* — Merchant & Gould P.C.

(57) ABSTRACT

A connection block mounting frame and method of use are disclosed. In one example, a connection block mounting frame includes a block mounting interface on a front end of the connection block mounting frame, the block mounting interface including a plurality of block mounting locations each configured to receive a connection block. The connection block mounting frame includes a mounting surface on a back side of the connection block mounting frame and including a plurality of mounting locations and a plurality of cable routing openings. The connection block mounting frame further includes a second surface on a back side of the connection block mounting frame offset from the mounting surface and forming a cable routing path along the back side and external to the connection block mounting frame.

18 Claims, 16 Drawing Sheets

FIG. 4
FIG. 5
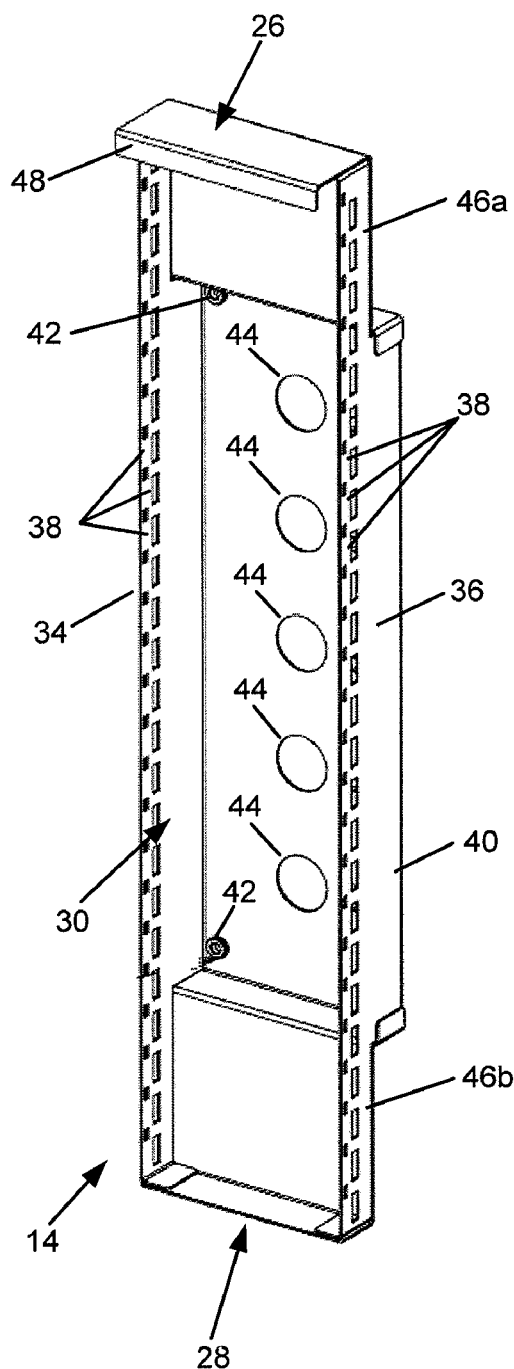
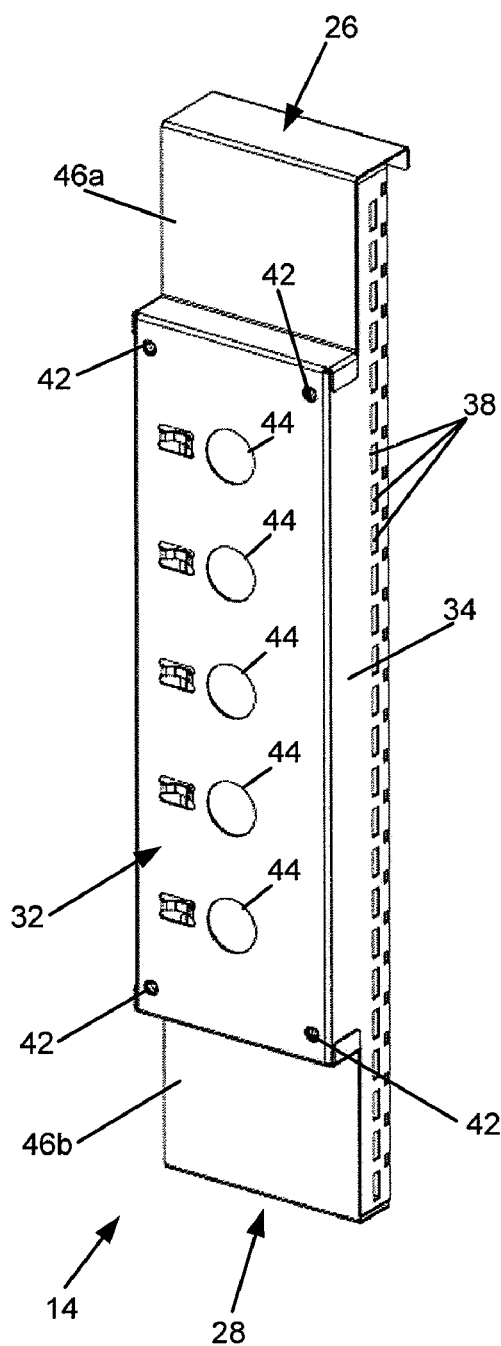

FIG. 6
FIG. 7
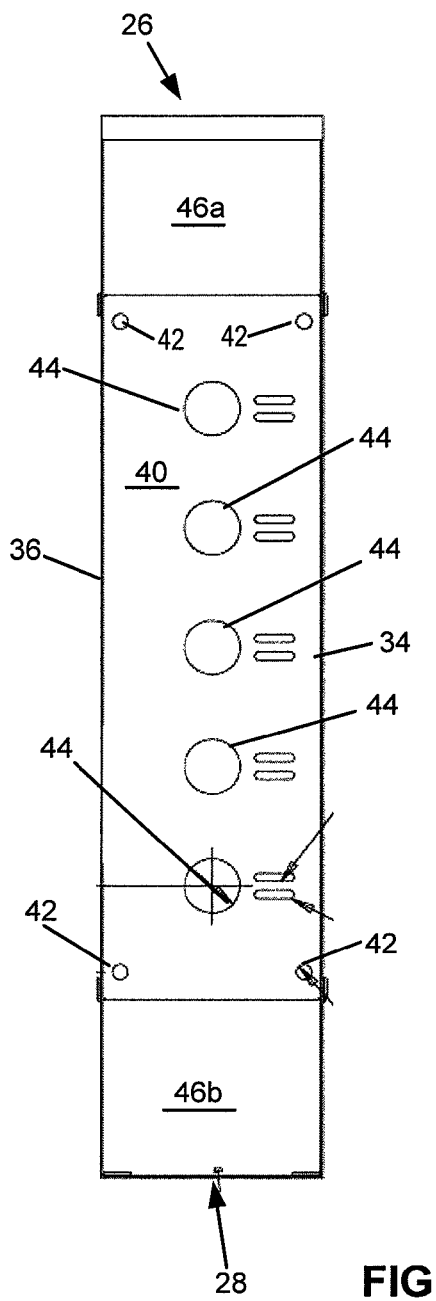
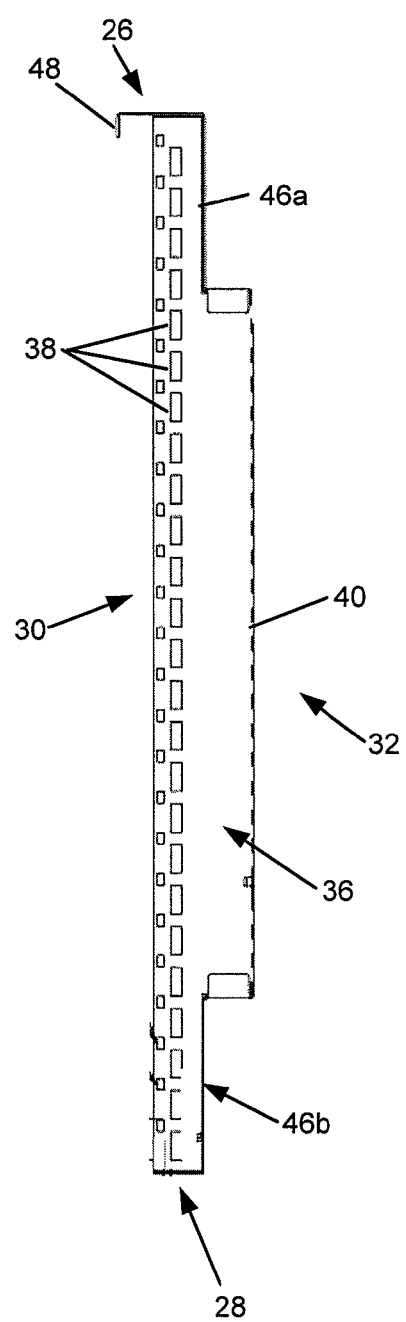
FIG. 8
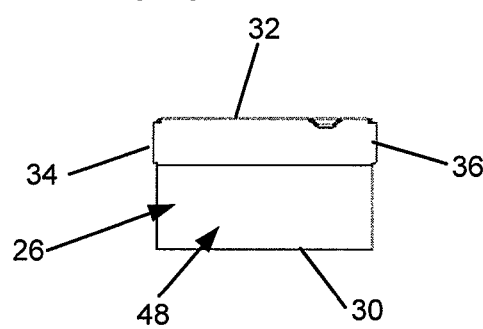

CONNECTION BLOCK MOUNTING FRAME

CROSS-REFERENCE TO RELATED APPLICATIONS

The present application claims priority to U.S. Provisional Patent Application No. 61/170,412, filed Apr. 17, 2009, the disclosure of which is hereby incorporated by reference in its entirety.

TECHNICAL FIELD

The present disclosure relates to mounting arrangements for telecommunications equipment. In particular, the present disclosure relates to a connection block mounting frame.

BACKGROUND

Telecommunications systems generally include connection and disconnection systems, through which various types of telecommunications equipment are interconnected. Such systems generally require use of connection blocks for routing connections among subscribers, equipment, and back office routing systems.

In certain systems, a piece of equipment is used for connection of equipment in telecommunications systems which is referred to herein as a connection block, sometimes referred to as a "Krone-style connector block", such as those manufactured by ADC GmbH, formerly Krone GmbH. These connection blocks provide an array of punch-down connection locations useable for individual wire pairs, and include circuit protection and connection locations in a single linear array. Each individual wire pair connection in a connection block includes a first wire pair connection that can be connected to a subscriber line or other telecommunications equipment, and a second wire pair connection used for connecting to other equipment or cross-connection of connection blocks.

Krone-style blocks are often used to connect subscribers to telecommunications services, and are typically arranged in groups to provide a central location for routing signals among subscribers and equipment. Often, connection blocks are mounted in arrays to a panel or other planar surface in close proximity to each other. Each array is mounted to a connection block mounting frame, which is in turn mounted to a plate. The mounting plate typically is a metal plate used for mounting the connection blocks to a panel, and for providing internal area for routing signals to telecommunications equipment or subscriber lines. The mounting plate spans a constant distance from the connection blocks to the planar surface.

While a subscriber line to telecommunications equipment, a technician typically connects an exposed wired pair connection associated with the subscriber on one of the connection blocks with a wired pair connection associated with telecommunications equipment, typically on a different block or array of blocks. This connection is typically made by a technician in the field by connecting jumper wires between the blocks.

Depending upon the distance between the blocks to be connected, and in particular where the blocks to be connected are in different arrays in a cross-connect panel (or different panels), the jumper wires connecting between the blocks must be routed around a top or bottom edge of one of the connection block mounting frames. While it is desirable to locate the arrays of connection blocks (and therefore the mounting frames) in close proximity to each other to improve circuit density, some distance between the arrays has been necessary to allow space for routing of jumpers.

SUMMARY

The present disclosure relates generally to a connection block mounting frame, such as can be used in a cross-connect panel or other telecommunications connection assembly. The connection block mounting frame is arranged to provide for mounting of Krone-style connections blocks in close proximity, while creating additional space in a cross-connect panel for cable routing among blocks by including a cableway for jumpers passing behind a portion of the mounting frame.

In a first aspect, a connection block mounting frame includes a block mounting interface on a front end of the connection block mounting frame, the block mounting interface including a plurality of block mounting locations each configured to receive a connection block. The connection block mounting frame includes a mounting surface on a back side of the connection block mounting frame and including a plurality of mounting locations and a plurality of cable routing openings. The connection block mounting frame further includes a second surface on a back side of the connection block mounting frame offset from the mounting surface and forming a cable routing path along the back side and external to the connection block mounting frame.

In a second aspect, a cross connect panel includes a panel surface, a connection block mounting frame mounted to the panel surface, and a plurality of connection blocks mounted to the connection block mounting frame. The connection block mounting frame includes a block mounting interface on a front end of the connection block mounting frame, the block mounting interface including a plurality of block mounting locations each configured to receive a connection block. The connection block mounting frame includes a mounting surface on a back side of the connection block mounting frame and including a plurality of mounting locations and a plurality of cable routing openings. The connection block mounting frame further includes a second surface on a back side of the connection block mounting frame offset from the mounting surface and forming a cable routing path along the back side and external to the connection block mounting frame. The plurality of connection blocks cooperate to close the front end of the connection block mounting frame.

In a third aspect, a connection block assembly is disclosed. The connection block assembly includes a connection block mounting frame. The connection block mounting frame includes a block mounting interface on a front end of the connection block mounting frame including a plurality of block mounting locations, each of the block mounting locations configured to receive a connection block. The connection block mounting frame also includes a mounting surface on a back side of the connection block mounting frame and including a plurality of mounting locations and a plurality of cable routing openings. The connection block mounting frame also includes a second surface on a back side of the connection block mounting frame and offset from the mounting surface toward the front end of the connection block mounting frame and forming a cable routing path along the back side and external to the connection block mounting frame. The connection block assembly further includes a plurality of connection blocks mounted to connection block mounting frame at each of the plurality of block mounting locations, each of the plurality of connection blocks including a linear array of wired pair connection locations.

In a fourth aspect, a method of connecting a jumper to a cross-connect panel is disclosed. The method includes connecting a first end of a jumper to a connection location on a connection block, routing the jumper through at least one cableway positioned between a panel surface and a rear offset surface of a connection block mounting frame, and connecting a second end of the jumper to a second connection location on a second connection block.

BRIEF DESCRIPTION OF THE DRAWINGS

FIG. 4 is a front perspective view of a mounting frame useable in the connection block assembly of FIG. 1;

FIG. 5 is a rear perspective view of the mounting frame of FIG. 4;

FIG. 6 is a front plan view of the mounting frame of FIG. 4;

FIG. 7 is a side plan view of the mounting frame of FIG. 4;

FIG. 8 is a top plan view of the mounting frame of FIG. 4;

DETAILED DESCRIPTION

Figure 1:
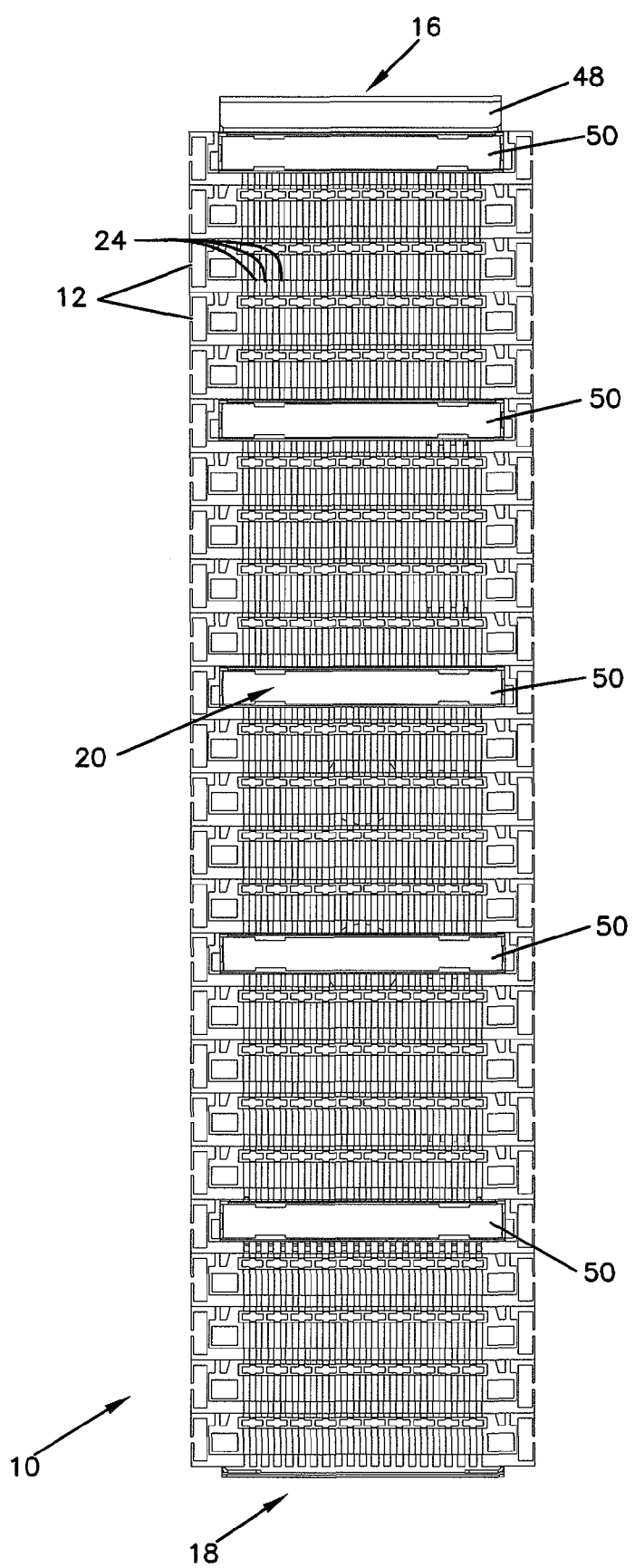
FIG. 1 is a front plan view of a connection block assembly mounted on a connection block mounting frame, according to a possible embodiment of the present disclosure.
Figure 2:
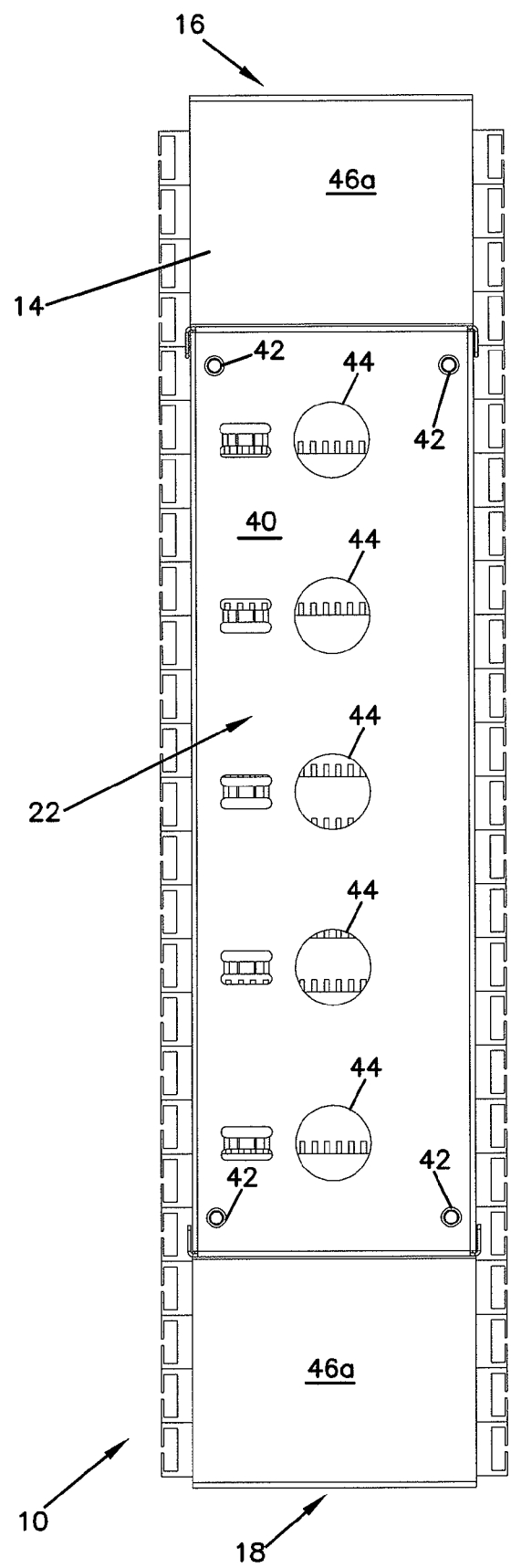
FIG. 2 is a rear plan view of the connection block assembly of FIG. 1.
Figure 3:
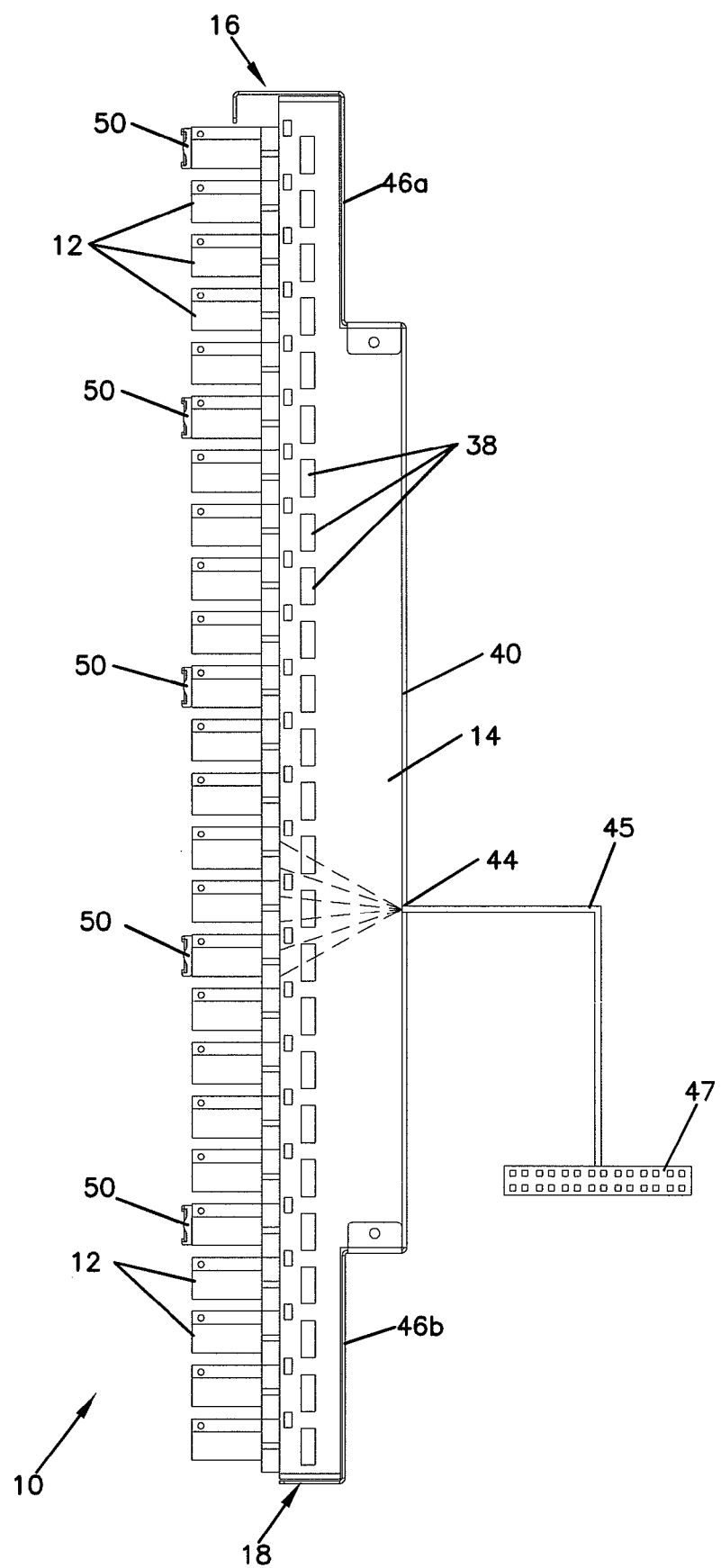
FIG. 3 is a side plan view of the connection block assembly of FIG. 1, with example schematic wiring depicted.
Figure 9:
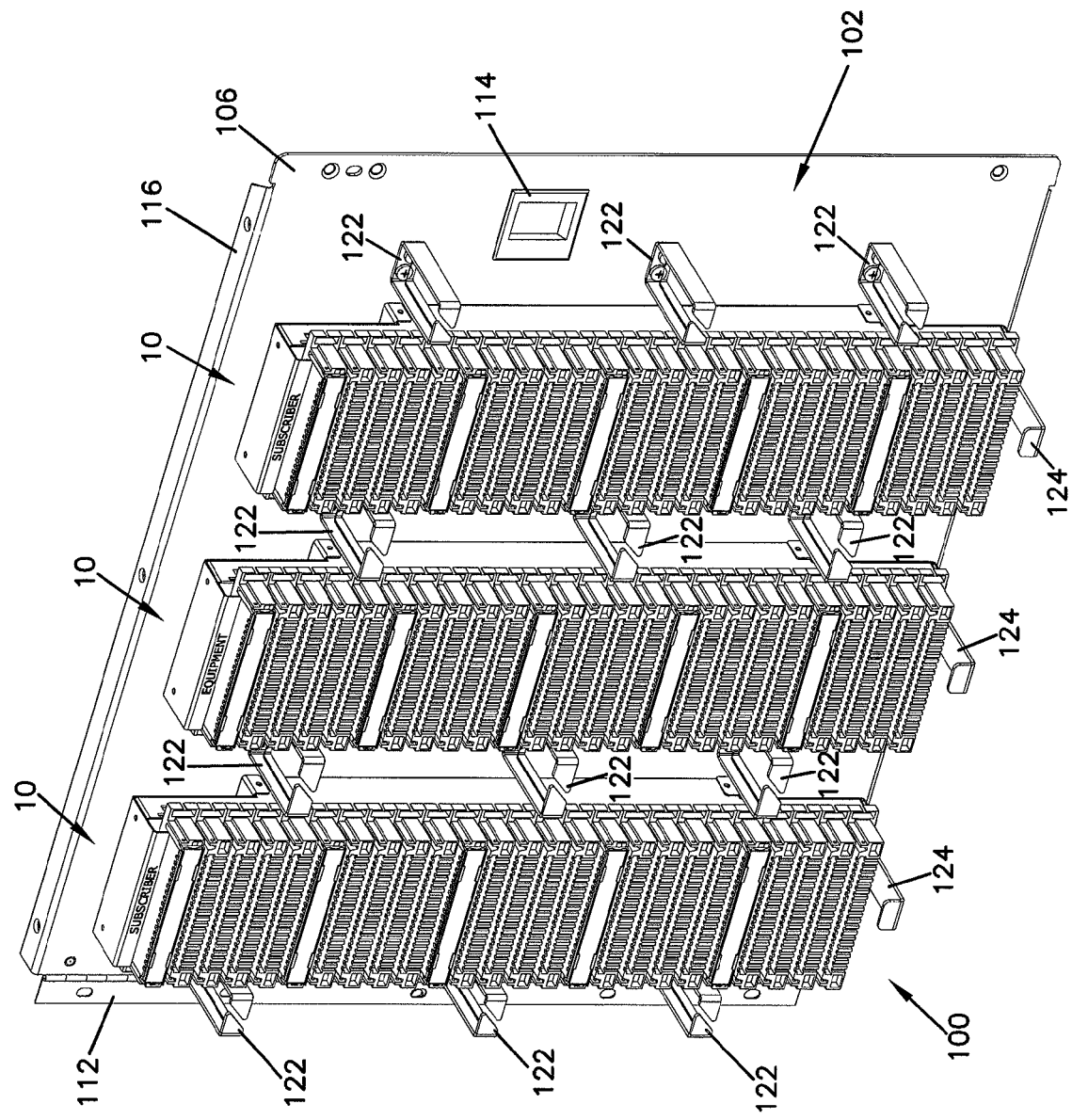
FIG. 9 is a front perspective view of a cross-connect panel including connection block assemblies mounted thereon, according to an embodiment of the present disclosure.
Figure 10:
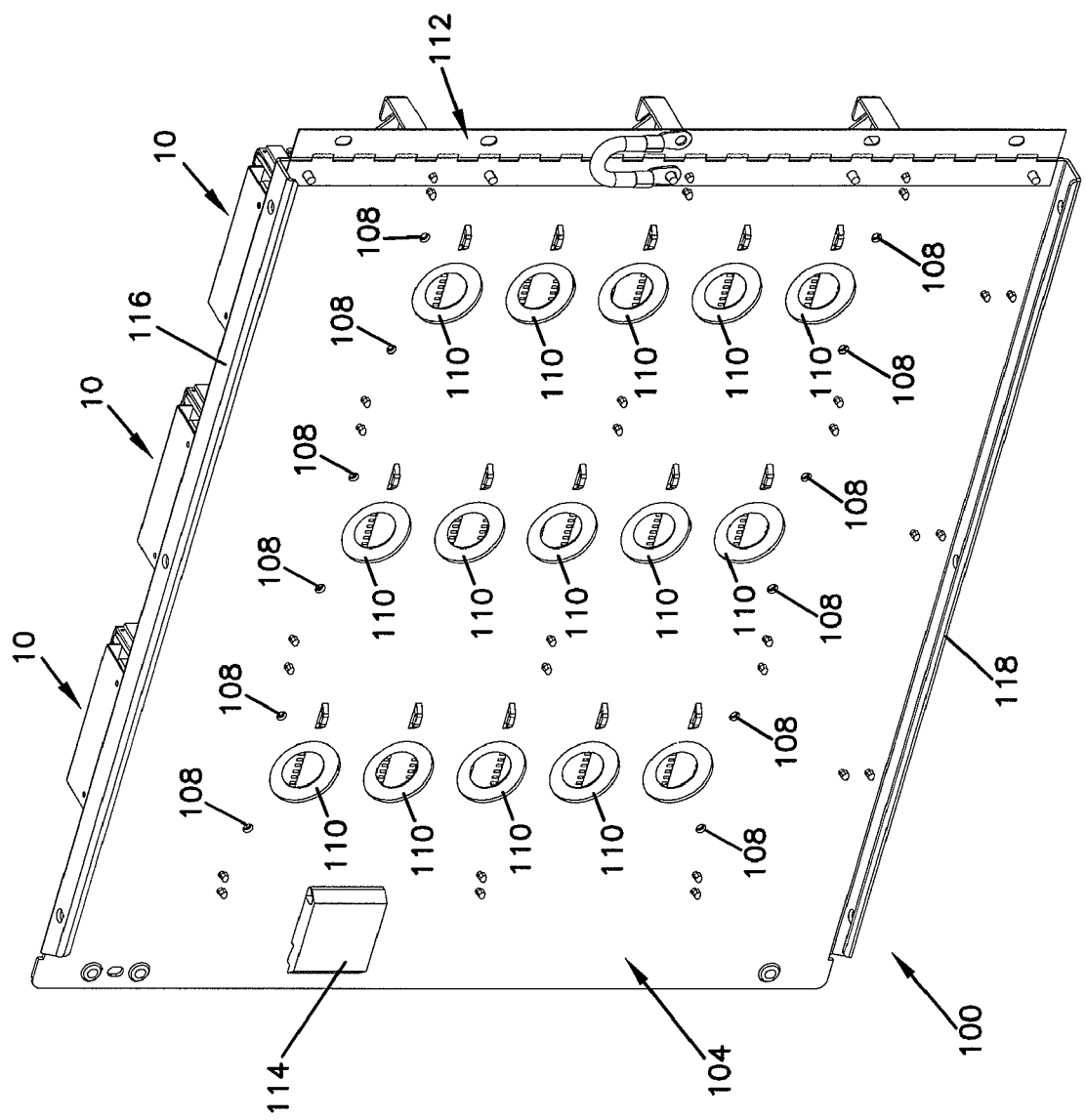
FIG. 10 is a rear perspective view of the cross-connect panel of FIG. 9.

Referring to FIGS. 1-8, a connection block assembly 10 is shown, which is useable to implement aspects of the present disclosure. The connection block assembly 10 generally provides a tightly-arranged array of connection blocks 12, useable within a cross-connect panel or other type of connection panel.

The connection block assembly 10 includes a plurality of connection blocks 12 mounted on a mounting frame 14. The assembly 10, as formed, has a top side 16, bottom side 18, front 20, and back side 22. The connection blocks 12 each mount on the front 20 of the assembly 10, and extend in a generally linear array from the top side 16 to the bottom side 18 of the assembly.

The connection blocks 12 each include a plurality of wire pair connection locations 24 on a front side of the connection block, and corresponding wire pair connection locations preferably located on a top or bottom side (not shown) or other non-frontal position on each connection block. In certain instances, the connection blocks can include 8-12 connection locations 24 per block arranged linearly. Preferably, the wire pair connection locations on the rear side of the connection blocks (internal to the mounting frame 14) are connected to wires which are routed through wire routing paths in the mounting frame, discussed in further detail below.

The connection blocks 12 can be any of a number of types of high contact density connection blocks, such as a Krone-style connection block. In certain embodiments, the connection blocks 12 can be either termination or cross-connect type Series NT Krone-style blocks manufactured by ADC GmbH and ADC Telecommunications, Inc. Example Krone-style blocks useable in the connection block assembly 10 are disclosed in German Patent No. DE3728368 and German Patent Application No. DE10001553. Additional details are described in U.S. Pat. Nos. 7,147,412; 7,008,243; 5,494,461; 5,163,855; 5,033,974; and 4,871,330, the disclosures of which are hereby incorporated by reference in their entireties. Within the connection block assembly 10, the connection blocks preferably are a uniform type of connection block.

The mounting frame 14 provides a structure for mounting the connection blocks 12 in close proximity, while maintaining space for cable routing along a rear side of the connection blocks (internal to the mounting frame 14). Typically, the mounting frame is constructed of sheet metal or other conductive material to assist with grounding of the connection blocks. The mounting frame 14 has a top 26, bottom 28, front end 30, back side 32, and left and right sides 34, 36, respectively.

The front end 30 of the mounting frame 14 provides a connection block mounting interface for a plurality of connection blocks. The connection blocks 12 fit to the front end 30 of the mounting frame 14, and attach at mounting locations 38 defined in the left and right sides 34, 36. The mounting locations 38 can include, for example, openings in the mounting frame into which the connection blocks can connect in a snap-fit or other connective arrangement. The connection blocks 12, when mounted in close proximity at the defined mounting locations 38, cooperate to close off the open front end 30 of the mounting frame 14.

The rear side 32 of the mounting frame 14 includes a mounting surface 40, which includes mounting locations 42 and cable routing openings 44. The mounting locations 42 are configured to receive fasteners (e.g. bolts or other fastening equipment) for connecting the mounting surface 40 to a cross-connect panel, such as shown in FIGS. 9-20. The cable routing openings 44 allow cables connected to the rear side of the connection blocks 12 to exit the mounting frame 14. These cables typically connect to subscribers or telecommunications equipment, which are interconnected by jumpers on the front 20 of the connection block assembly 10. As illustrated in particular in FIG. 3, a cable bundle 45 can be routed through one of the cable routing openings 44, and individual cables can be connected to each of the connection locations in a number of connection blocks. The cable bundle 45 can lead to a connector (e.g. connector 47 as shown) which can connect to subscribers or telecommunications equipment. Although in the embodiment shown five cable routing openings 44 are included in the mounting frame 14, more or fewer openings could be included as well to accommodate any number of cable bundles or individual cables.

The back side 32 of the mounting frame 14 also includes a pair of offset surfaces 46a-b. The offset surfaces 46a-b extend from the top 26 and bottom 28 of the back side 32, respectively, and are offset in a direction toward the front end 30. The offset surfaces 46a-b are, in the embodiment shown, approximately parallel with the mounting surface 40 and with each other, although other arrangements or alignments of the offset surfaces would be possible as well.

When the assembly 10 is mounted to a surface (e.g. the cross-connect panels described below) via the mounting locations 42, the offset surfaces 46a-b form a void behind the assembly 10 that can be used by a technician for routing jumpers among the assemblies 10. This available wire routing area allows manufacturers of cross-connect panels to place assemblies 10 in closer vertical proximity to each other, because less space is required to be reserved for horizontal jumper routing when connecting jumpers between connection block assemblies in a cross-connect panel. Alternatively, horizontal proximity could be improved, depending upon the orientation and location of the assembly and offset surfaces 46a-b. Example cable routing behind an assembly is shown in conjunction with the cross-connect panels of FIGS. 9-20, particularly in FIGS. 11 and 17.

The mounting frame 14 optionally includes a front overhang 48, which can be used for labeling the types of connections made at the assembly 10. Additionally, one or more labeled covers 50 can optionally be affixed over a row of connection locations 24 on a connection block 12, and can indicate the intended connections to be used in association with that assembly 10. For example, the labeled cover 50 can include printing on a front face to indicate that the assembly 10 connects to certain subscribers, connects to certain telecommunications equipment, or other systems.

Although in the embodiment shown, the connector block assembly 10 is arranged to include 25 connector blocks, other sizes or arrangements of connector blocks could be used as well. For example, connector block assemblies including 50 or 100 connector blocks could be formed, requiring additional vertical space and analogous routing space along the offset surfaces 46a-b to accommodate additional routing of jumpers.

Referring now to FIGS. 9-13, a cross-connect panel 100 is shown in which the connector block assemblies 10 of FIGS. 1-8 can be used. The cross-connect panel 100 is arranged for use in a telecommunications installation, such as a cabinet, or otherwise in proximity to telecommunications equipment. Generally, the cross-connect panel 100 allows a technician to connect subscriber lines to telecommunications equipment to activate telecommunications services for those subscribers, while separating this cross-connection area from the specific connections to the telecommunications equipment and subscribers.

The cross-connect panel 100 includes a front side 102 and a back side 104. In the cross-connect panel 100 shown, three connector block assemblies 10 are mounted to a front side 102 of a panel surface 106. In this embodiment, a center assembly 10 is connected to telecommunications equipment, while adjacent side assemblies 10 connect to subscribers. However, in alternative arrangements, more or fewer connector block assemblies can be used, and arrangement of connections to equipment and subscribers can be varied.

The panel surface 106 is generally sized to receive the connector block assemblies 10, and includes mounting locations 108 and cable routing openings 110 analogous to those found on the mounting frame 14. When each assembly 10 is mounted to the panel surface 106, the mounting locations 108 and cable routing openings 110 align, allowing for mounting of the assembly 10 to the panel surface 106 and routing of wires from the back side of connector blocks 12 through the cable routing openings 44, 110 to subscribers or telecommunications equipment, depending upon the intended use of the assembly 10.

Figure 14:
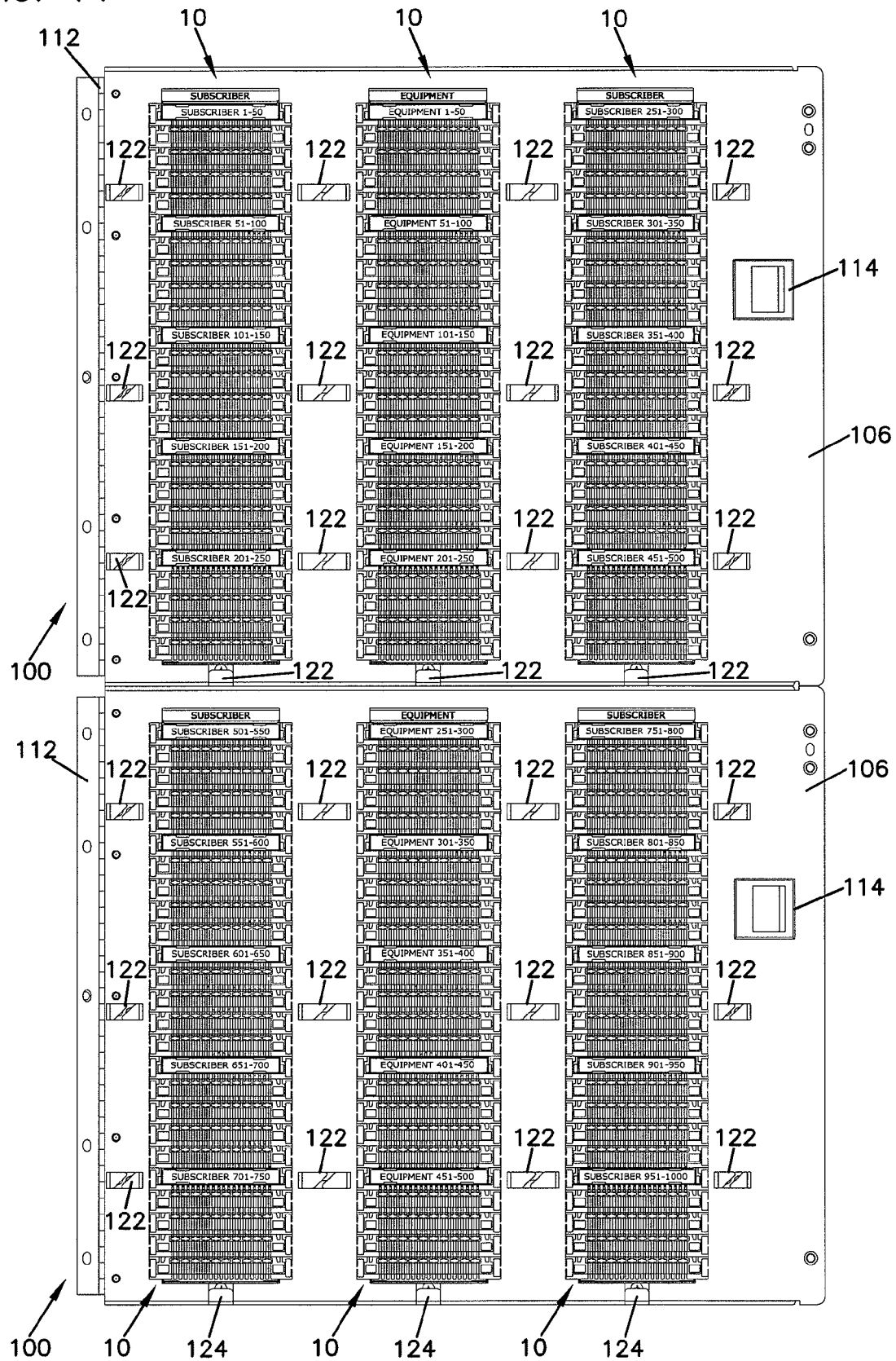
FIG. 14 is a front plan view of a cross-connect panel assembly using cross-connect panels as shown in FIG. 9.
Figure 15:
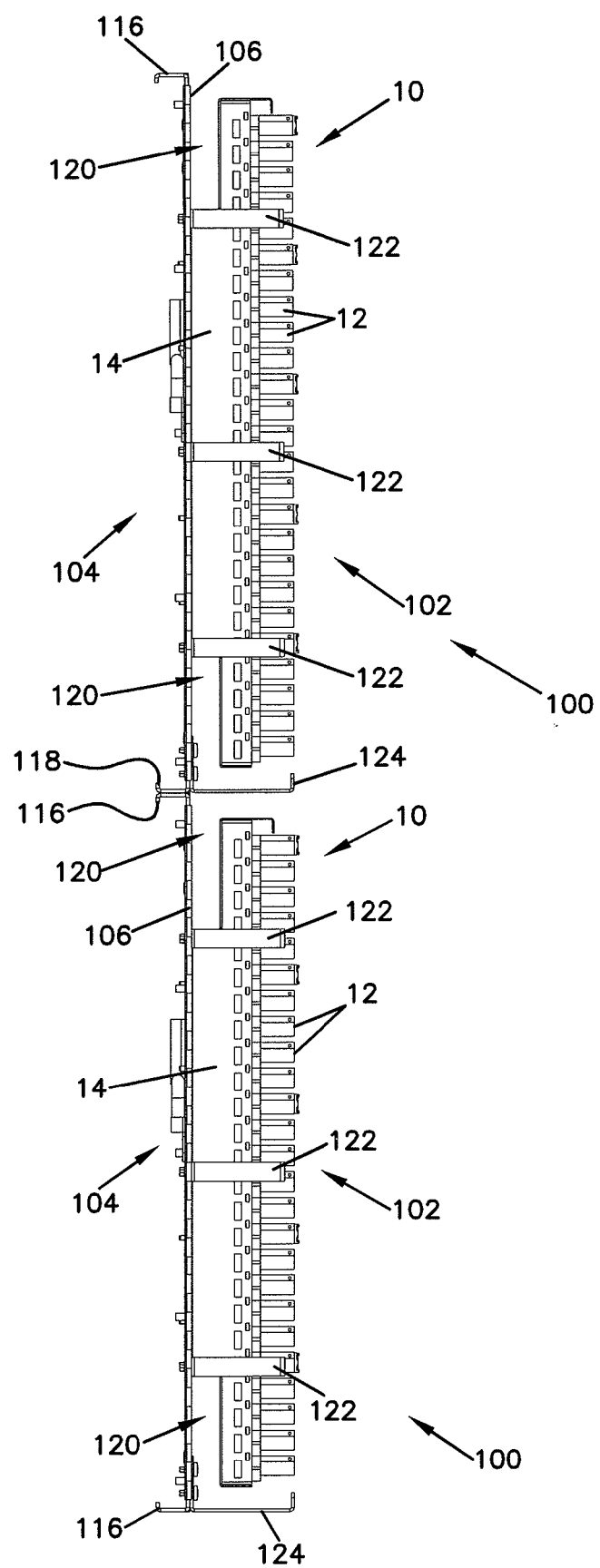
FIG. 15 is a side plan view of the cross-connect panel assembly of FIG. 14.

The panel surface 106 can optionally include a hinged connection arrangement 112 and spring-loaded clasp 114, and can operate as a door within a telecommunications enclosure. In such an arrangement, a technician is presented with the front surface 102 of the panel 100, but can open the door and swing the panel along the hinge to access telecommunications wiring and equipment stored behind the panel. Flanged top and bottom edges 116, 118 of the panel 100 allow connection to adjacent panels or surfaces (e.g. connection of adjacent panels as shown in FIGS. 14-15).

When the connection block assemblies 10 are mounted to the panel surface 106, cableways 120 are formed between the connection block assemblies and the panel surface 106 at the location of the offset surfaces 46a-b of each assembly. The cableways 120, in the orientation and arrangement shown, provide horizontal cable routing paths between the assemblies at the top and bottom ends of the connection block assemblies.

A plurality of cable guides 122 are mounted to the panel surface 106, and provide additional cableways for jumpers passing between connection blocks 12 and connection block assemblies 10. Through use of the cableways 120 and cable guides 122, a technician can easily maintain routing arrangements between connection blocks 12 in the cross-connect panel 100, avoiding complicated cross-wiring and attendant wiring entanglements. In the embodiment shown, three cable guides are positioned along each side of the connection block assemblies 10 to provide a vertical cableway. Additionally, a cable guide 124 is positioned along a bottom of each connection block assembly 10 to further define cableways 120. Other sizes and arrangements of cable guides can be used in the cross-connect panel as well.

Figure 11:
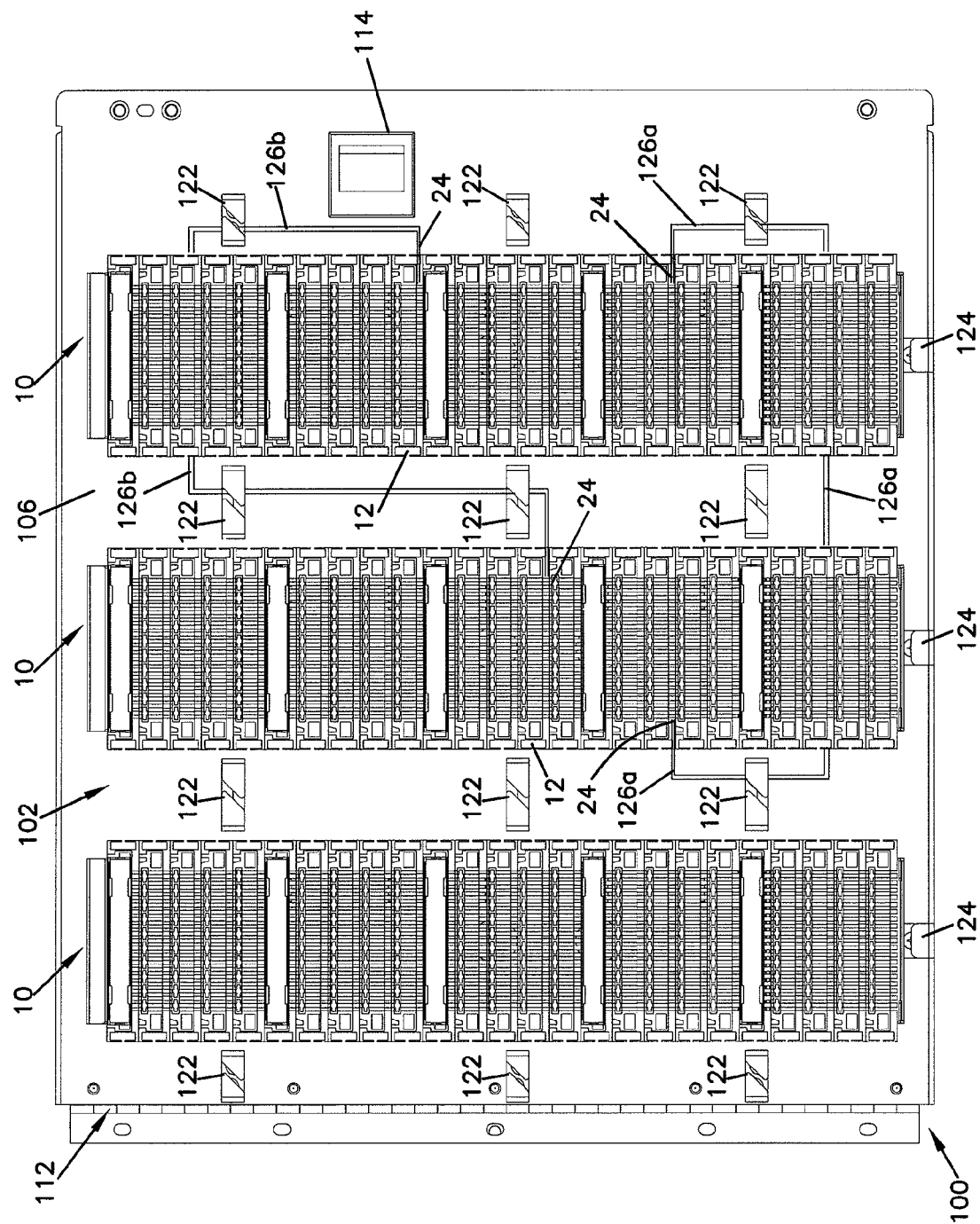
FIG. 11 is a front plan view of the cross-connect panel of FIG. 9 including example jumpers installed thereon.
Figure 12:
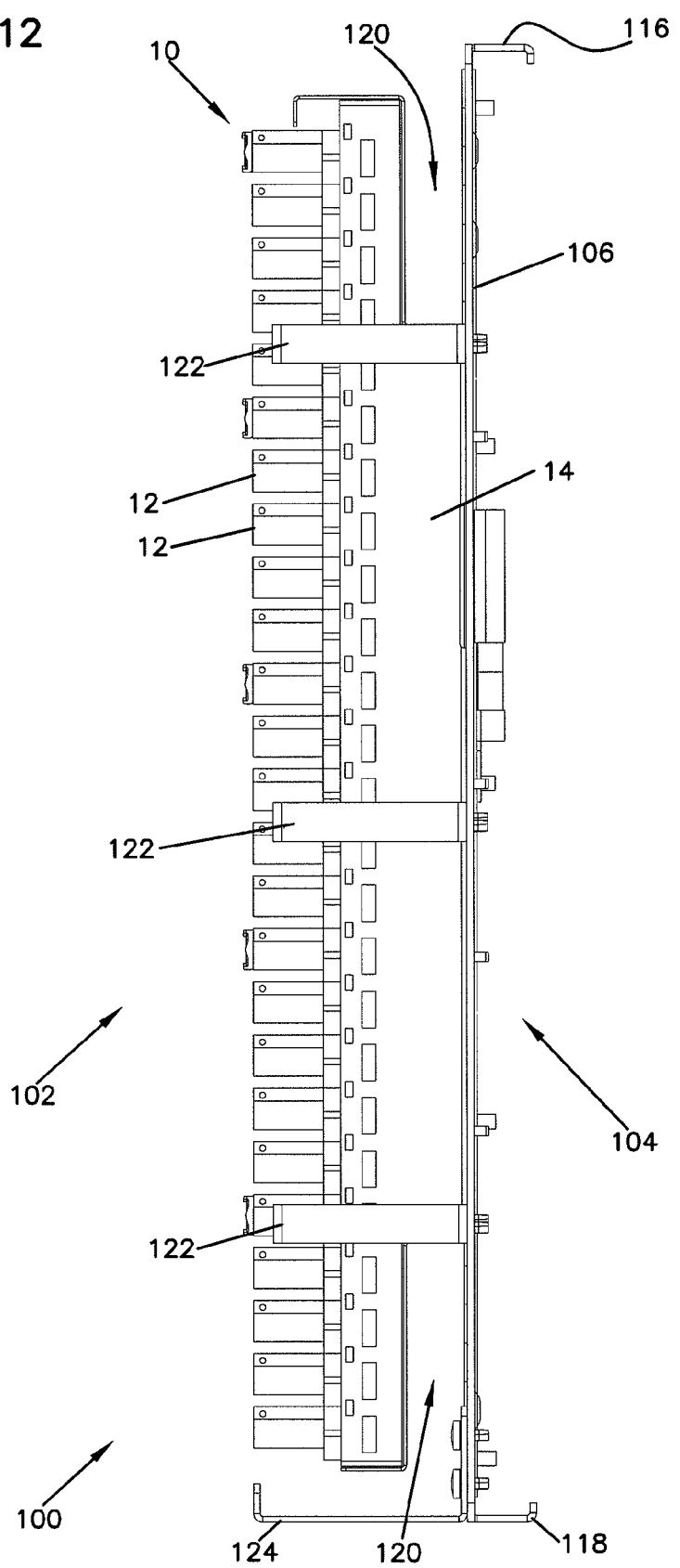
FIG. 12 is a side plan view of the cross-connect panel of FIG. 9.
Figure 13:
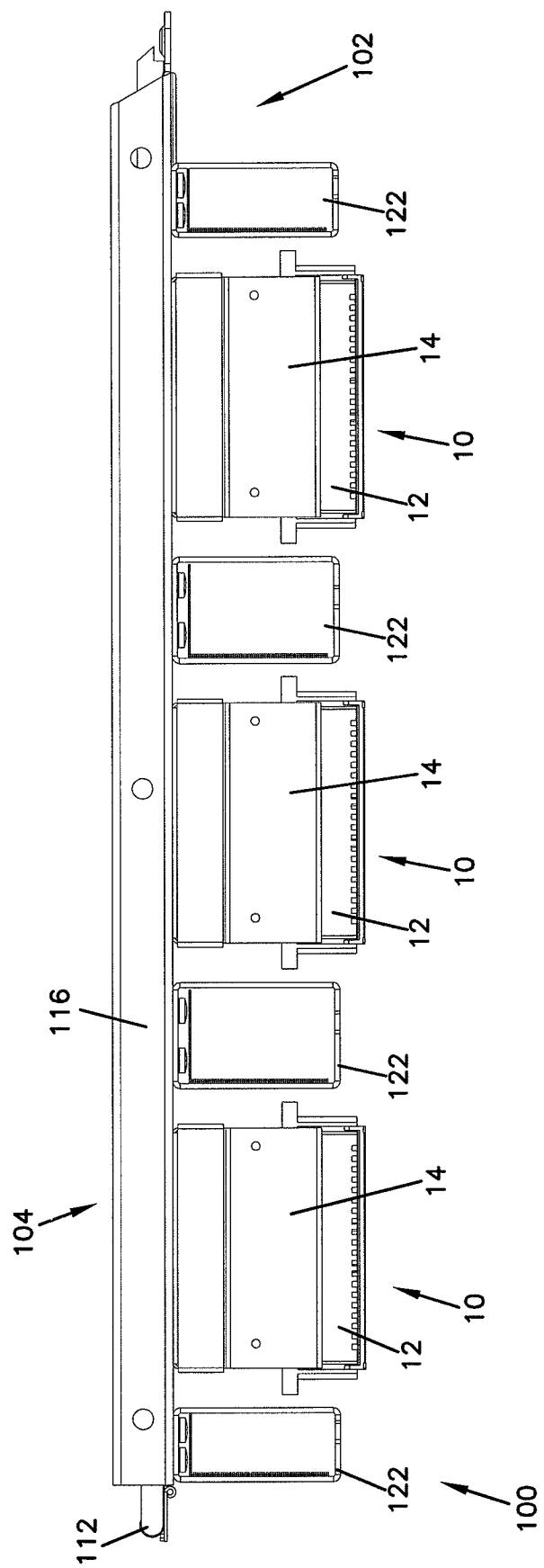
FIG. 13 is a top plan view of the cross-connect panel of FIG. 9.

Referring now particularly to FIG. 11, two example jumpers 126a, 126b connected between connection blocks are shown, illustrating use of the cableways 120 to connect equipment and subscribers as would be performed by a technician. In the embodiment shown, jumpers 126a-b connect between the middle connection block assembly (illustrated as connecting to telecommunications equipment) and the right-side connection block assembly (illustrated as connecting to subscribers), between connection locations 24 that are distant from each other. Jumpers typically are routed toward the nearest side of the connection block 12 due to space limitations within the connection block. Therefore, to connect two desired connection locations, a technician would attach the jumper 126a to a connection location (e.g. a punch down connection) associated with the desired subscriber, route the jumper 126a outward from the connection block, through a cable guide 122 and through lower cableways 120 of two of the assemblies, and then upward through a second cable guide 122 along a vertical path to the connection location 24 associated with the desired telecommunications equipment. Jumper 126b could similarly be connected through two cable guides 122, an upper cableway 120 of the rightmost assembly 10, and then vertically downward through a cable guide 122 to the desired connection block 12 and associated connection location 24.

FIGS. 14-15 illustrate usage of adjacent cross-connect panels 100 in a manner which improves connection density by reducing the space required between vertically adjacent connector block assemblies 10. In this arrangement, cross-connect panels 100 are located in a generally vertically adjacent configuration. A flanged bottom edge 118 of the top cross-connect panel 100 can be connected via a fastener (e.g. a bolt or other connection mechanism) to the flanged top edge 116 of the bottom cross-connect panel 100, such that both panels provide the same hinged movement when mounted within an enclosure. In the embodiment shown, particularly as illustrated in FIG. 15, cableways 120 provide substantial routing space for jumpers on a front side of the panels while ensuring that the connection block assemblies 10 of the top cross-connect panel 100 can be placed close to the connection block assemblies 10 of the bottom cross-connect panel (i.e. the connection block assemblies of each panel can extend nearly the entire height of the panel).

Figure 16:
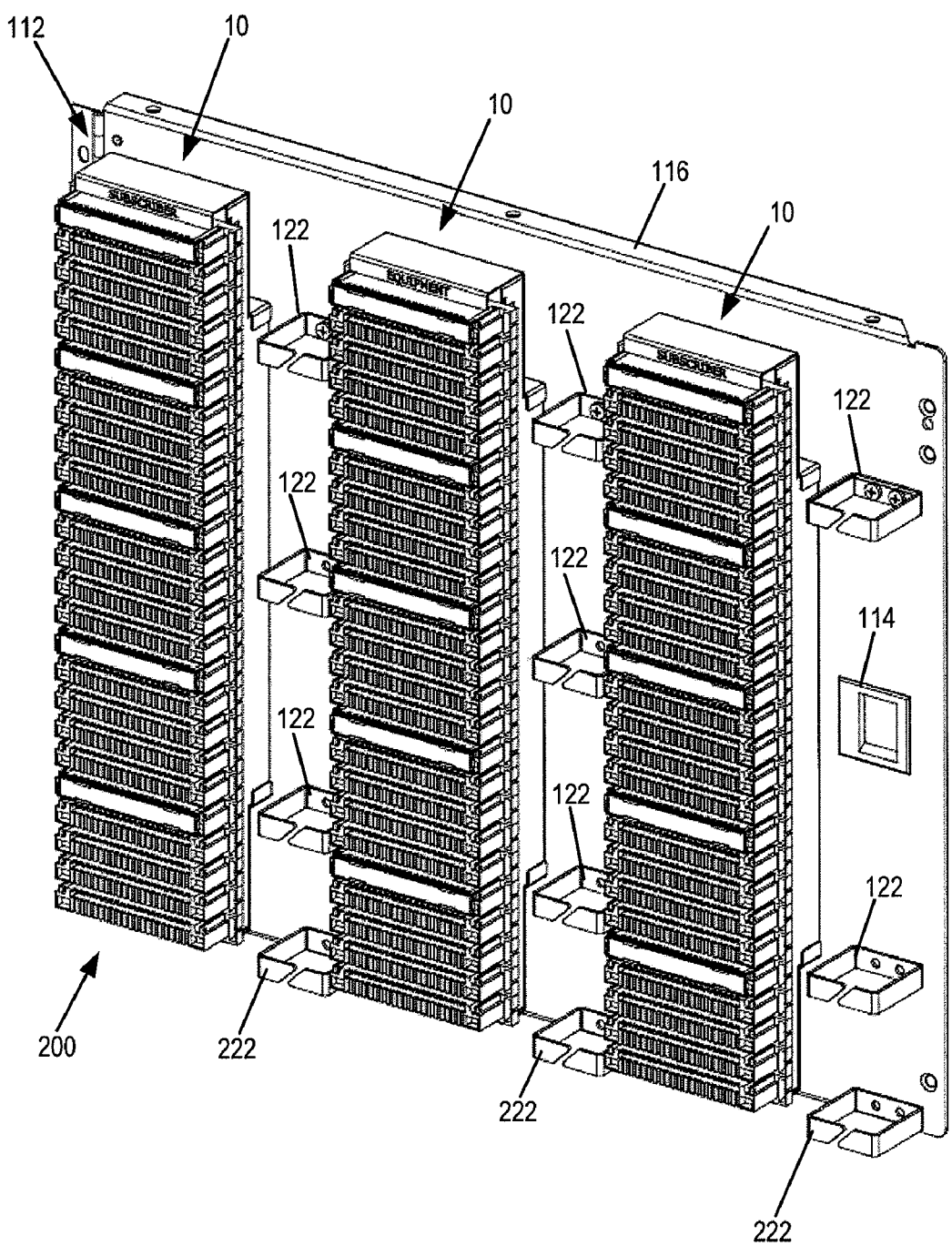
FIG. 16 is a front perspective view of a cross-connect panel including connection block array assemblies mounted thereon, according to a further embodiment of the present disclosure.
Figure 17:
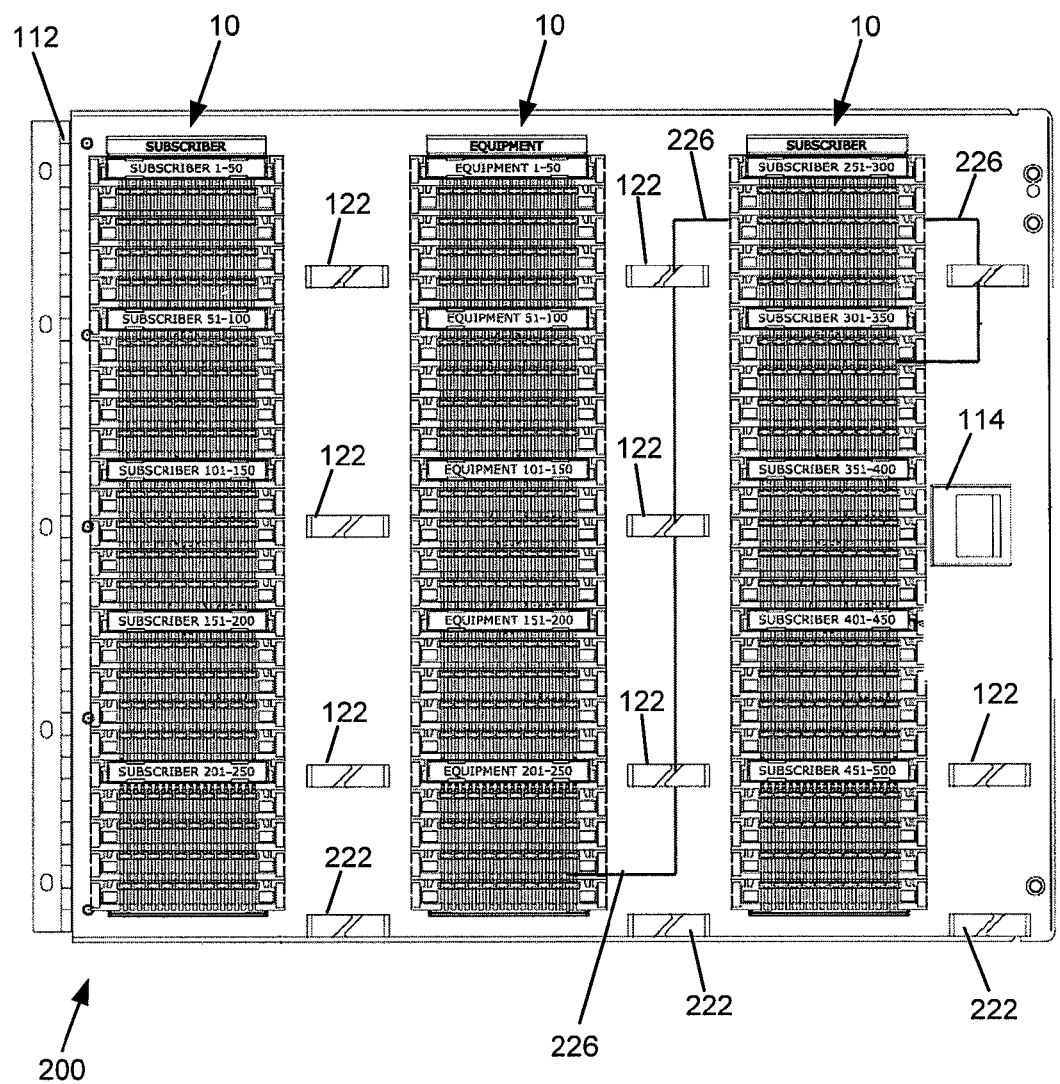
FIG. 17 is a front plan view of the cross-connect panel of FIG. 16.
Figure 18:
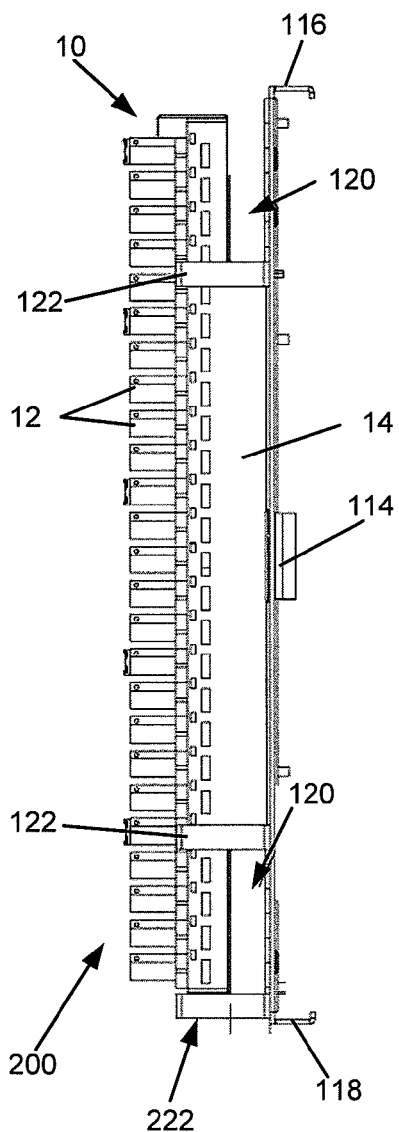
FIG. 18 is a side plan view of the cross-connect panel of FIG. 16.
Figure 19:
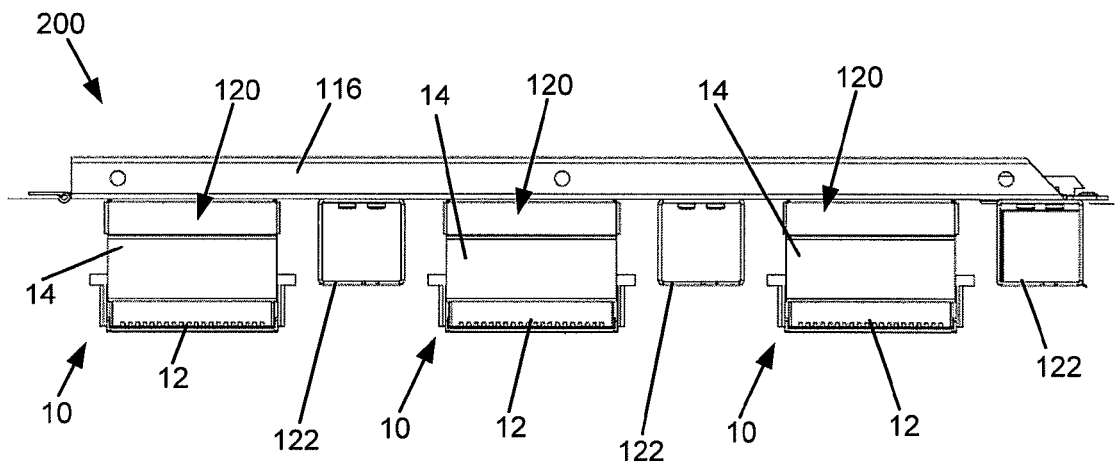
FIG. 19 is a top plan view of the cross-connect panel of FIG. 16.
Figure 20:
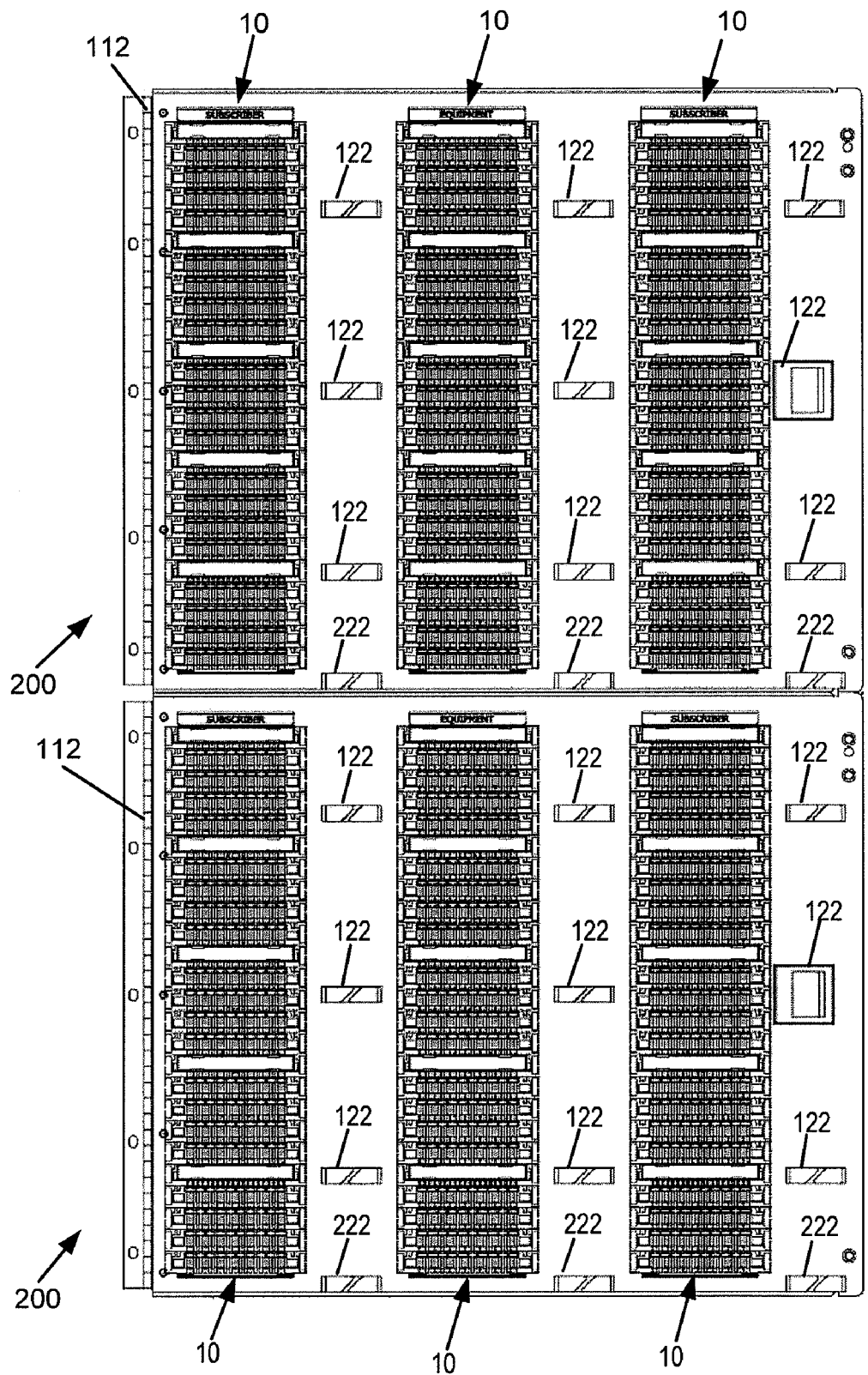
FIG. 20 is a front plan view of a cross-connect panel assembly using cross-connect panels as shown in FIG. 16.

Referring now to FIGS. 16-18, a second possible embodiment of a cross-connect panel 200 is shown. Generally the cross-connect panel 200 corresponds to panel 100 of FIGS. 9-15, but includes an alternative arrangement of connection block assemblies and cable guides. In the embodiment shown, three connection block assemblies 10 are included on the front side of the panel 200, but are offset toward the hinge 112. In this configuration, cable guides 122 are positioned to the right side of each of the connection block assemblies 10, and the cable guides 122 located to the left of the leftmost connection block assembly 10 (illustrated as a subscriber assembly) are excluded from the panel. Furthermore, in the panel 200, additional cable guides 222 are located at the bottom edge of the panel, to enable routing of jumpers between vertically adjacent panels. FIGS. 19-20 illustrate usage of the cross-connect panels 200 in an arrangement analogous to that shown in FIGS. 14-15, illustrating the arrangement and location of the cable guides 222 for cross-connecting between adjacent panels.

Referring now particularly to FIG. 17, a further example jumper 226 is illustrated, connecting between two connection block assemblies on a cross-connect panel 200. In the example arrangement shown, a technician can connect a first end of the jumper 226 to a connection location 24 of a connection block 12 in the center panel assembly (e.g. a connection location relating to active telecommunication equipment), and through three vertical cable guides 122, an upper cableway 120 of the rightmost connection block assembly 10, and back downward through a cable guide 122 to a desired connection location 24.

Generally, related to FIGS. 9-20, as more subscribers are added to a telecommunications network, additional jumpers will be added to cross-connect panels, requiring that space be reserved for cable routing on the panel. By using space that is between the connection block assemblies and the panel surface for routing of jumpers, the distance between the routing frames can be decreased and therefore the density of connection blocks in a cross-connect panel can be increased.

Although, in the present disclosure, the terms top, bottom, side, vertical, and horizontal are used, it is understood that the orientation of the connector block assemblies 10 can be altered within a cross-connect panel or other type of connection system. Furthermore, the orientation of the connector blocks, the location of the offset surfaces, or the arrangement of cross-connect panels could be varied. For example, horizontally adjacent connector block assemblies would derive advantages from offset surfaces on a back side of a mounting frame leading from the adjacent horizontal sides of those assemblies. Other differences of orientation are possible as well, and are contemplated by the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A connection block mounting frame comprising:
    a block mounting interface on a front end of the connection block mounting frame, the block mounting interface including a plurality of block mounting locations, each of the block mounting locations configured to receive a connection block;
    a mounting surface on a back side of the connection block mounting frame, the mounting surface including a plurality of mounting locations and a plurality of cable routing openings; and
    a second surface on a back side of the connection block mounting frame, the second surface offset from the mounting surface toward the front end of the connection block mounting frame and forming a cable routing path along the back side and external to the connection block mounting frame.

2. The connection block mounting frame of claim 1, wherein the second surface is approximately parallel with the mounting surface.

3. The connection block mounting frame of claim 1, wherein the first surface extends from a top side and at least partially along the rear side of the connection block mounting frame.

4. The connection block mounting frame of claim 1, further comprising a third surface offset from the mounting surface toward the front end of the connection block mounting frame and forming a second cable routing path along the back side external to the connection block mounting frame.

5. The connection block mounting frame of claim 4, wherein the second surface extends from a bottom side and at least partially along the rear side of the connection block mounting frame.

6. The connection block mounting frame of claim 1, wherein the plurality of block mounting locations extends along a length of the connection block mounting frame from a top end to a bottom end to close the front end.

7. A cross-connect panel comprising:
    a panel surface;
    a connection block mounting frame mounted to the panel surface, the connection block mounting frame including:
        a block mounting interface on a front end of the connection block mounting frame, the block mounting interface including a plurality of block mounting locations, each of the block mounting locations configured to receive a connection block;
        a mounting surface on a back side of the connection block mounting frame, the mounting surface including a plurality of mounting locations for connection to the panel surface and a plurality of cable routing openings; and
        a second surface on a back side of the connection block mounting frame, the second surface offset from the mounting surface toward the front end of the connection block mounting frame and forming a cable routing path between the back side of the connection block mounting frame and the panel surface; and
    a plurality of connection blocks mounted to the connection block mounting frame, the plurality of connection blocks cooperating to close the front end of the connection block mounting frame.

8. The cross-connect panel of claim 7, further comprising a plurality of cable routing guides mounted to the panel surface.

9. The cross-connect panel of claim 7, further comprising a plurality of connection block mounting frames.

10. The cross-connect panel of claim 9, further comprising a plurality of cable routing clips mounted between the plurality of connection block mounting frames.

11. The cross-connect panel of claim 7, wherein the second surface of the connection block mounting frame is approximately parallel with the mounting surface.

12. The cross-connect panel of claim 7, wherein the first surface of the connection block mounting frame extends from a top side and at least partially along the rear side of the connection block mounting frame.

13. The cross-connect panel of claim 7, wherein the connection block mounting frame further includes a third surface offset from the mounting surface toward the front end of the connection block mounting frame and forming a second cable routing path along the back side external to the connection block mounting frame.

14. A connection block assembly comprising:
   a connection block mounting frame including:
      a block mounting interface on a front end of the connection block mounting frame, the block mounting interface including a plurality of block mounting locations, each of the block mounting locations configured to receive a connection block;
      a mounting surface on a back side of the connection block mounting frame, the mounting surface including a plurality of mounting locations and a plurality of cable routing openings; and
      a second surface on a back side of the connection block mounting frame, the second surface offset from the mounting surface toward the front end of the connection block mounting frame and forming a cable routing path along the back side and external to the connection block mounting frame; and
   a plurality of connection blocks mounted to connection block mounting frame at each of the plurality of block mounting locations, each of the plurality of connection blocks including a linear array of wired pair connection locations.

15. The connection block assembly of claim 14, further comprising a plurality of cables connected to the connection blocks within the mounting frame, and extending through at least one of the cable routing openings.

16. A method of connecting a jumper to a cross-connect panel, the method comprising:
   connecting a first end of a jumper to a connection location on a connection block;
   routing the jumper through at least one cableway positioned between a panel surface and a rear offset surface of a connection block mounting frame; and
   connecting a second end of the jumper to a second connection location on a second connection block.

17. The method of claim 16, further comprising routing the jumper vertically through a cable guide mounted to the panel surface.

18. The method of claim 16, wherein the connection block is mounted to the cross-connect panel and the second connection block is mounted to a second cross-connect panel adjacent to the cross-connect panel.

* * * * *